Patented Mar. 21, 1944

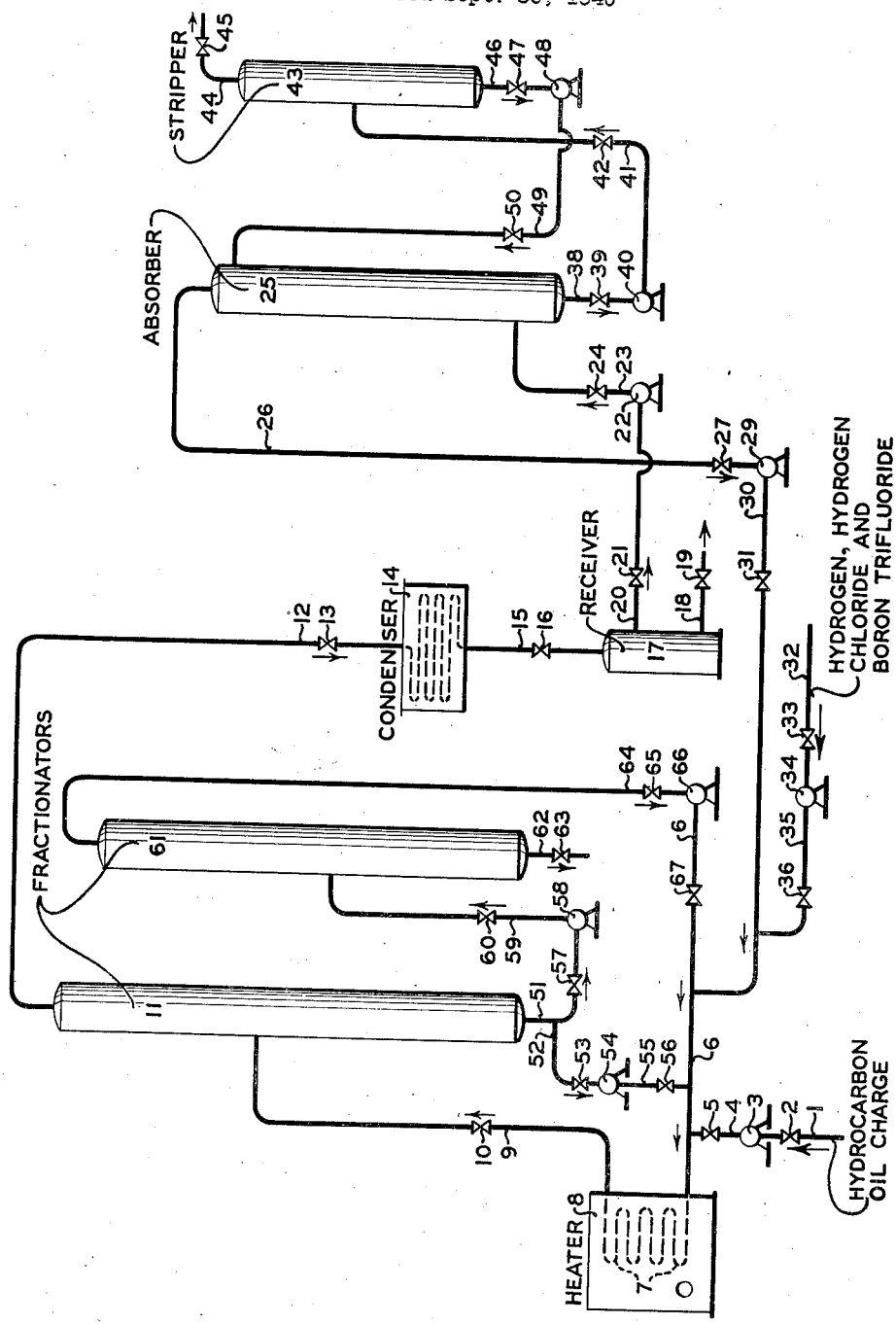

2,344,789

UNITED STATES PATENT OFFICE 2,344,789

DESTRUCTIVE HYDROGENATION OF HYDROCARBON OILS

Louis Schmerling, Chicago, Ill., assignor to Universal Oil Products Company, Chicago, Ill., a corporation of Delaware Application September 30, 1940, Serial No. 359,081

6 Claims. (Cl. 196—53)

This invention relates to destructive hydrogenation of hydrocarbon oils to produce therefrom substantial yields of isobutane and motor fuel. This process is particularly applicable to the treatment of gas oil distillates, but also may be applied to the treatment of other petroleum fractions. When applied to gas oil distillates, this process produces high yields of isobutane and motor fuel. When applied to the treatment of low boiling gasolines, the process may be primarily directed to the production of low boiling isoparaffins such as isobutane, isopentane, and isohexanes.

Isobutane has become a material of great importance to the oil industry as the result of processes of comparatively recent development which are effective in converting it to isoparaffins boiling within the range of gasoline and which are greatly in demand as fuel for airplanes. The isobutane may be catalytically or thermally dehydrogenated to form isobutene, which may then be polymerized to form branch chain octenes which hydrogenate readily to the corresponding iso-octanes. The isobutane may be alkylated with olefins using either thermal or catalytic processes to form isoparaffins boiling within the range of aviation gasoline. I have found that in the presence of boron trifluoride and hydrogen chloride, destructive hydrogenation of petroleum hydrocarbons takes place at relatively low temperatures with the formation of high yields of isoparaffins.

In one specific embodiment my invention comprises a process for the preparation of motor fuel and isobutane which comprises subjecting a hydrocarbon oil charging stock to the action of hydrogen in the presence of boron trifluoride and hydrogen chloride under such conditions of temperature, pressure, and time of contact so as to cause destructive hydrogenation of said charging stock with the formation of substantial yields of isobutane and motor fuel.

The following table shows the results that may be obtained by destructively hydrogenating normal octane in the presence of boron trifluoride and hydrogen chloride.

| | |
|---|---|
| Weight of n-octane_____grams__ | 250 |
| Catalyst: | |
|    Hydrogen chloride_____do____ | 35 |
|    Boron trifluoride_____do____ | 25 |
| Duration_____hours__ | 4 |
| Temperature_____° C__ | 125 |
| Pressure of hydrogen gas____atmospheres__ | 100 |

| Weight per cent of products: | Grams |
|---|---|
|   Normal octane | 24.1 |
|   Iso-hexane to iso-octane | 11.5 |
|   Normal pentane | 4.0 |
|   Iso-pentane | 11.0 |
|   Normal butane | 9.0 |
|   Isobutane | 19.0 |
|   Propane | 8.0 |
|   Non-condensible gases | 0.5 |
|   Tar | 5.0 |
|   Loss | 7.9 |
| | 100.0 |

The following second table shows the results obtained by treating a Pennsylvania gas oil of A. P. I. gravity of 44.1 with hydrogen in the presence of hydrogen chloride and boron trifluoride.

| | |
|---|---|
| Amount of charging stock_____grams__ | 300 |
| Hydrogen chloride_____do____ | 35 |
| Boron trifluoride_____do____ | 27 |
| Time of experiment_____hours__ | 4 |
| Temperature_____° C__ | 125 |
| Hydrogen pressure_____atmospheres__ | 75 |
| Liquid products_____weight per cent__ | 76 |
| 400° end point gasoline____volume per cent__ | 14.5 |
| Condensible gases_____weight per cent__ | 0.0 |
| Non-condensible gas_____ | 0.5 |
| Tar_____ | 20.0 |
| Loss_____ | 3.5 |

The following third table shows the effect of hydrogen on normal octane in the presence of boron trifluoride and in the absence of hydrogen chloride. The conditions of the experiment in other respects are similar to those employed in the experiment illustrated in the first table.

| | |
|---|---|
| Weight of normal octane_____grams__ | 122 |
| Catalyst: | |
|    Hydrogen chloride_____ | |
|    Boron trifluoride_____grams__ | 23 |
| Duration_____hours__ | 4 |
| Temperature_____° C__ | 125 |
| Pressure of hydrogen gas_____atmospheres__ | 100 |
| Weight per cent of products: | |
|   Normal octane | 80.9 |
|   Iso-hexane to iso-octane | |
|   Normal pentane | |
|   Iso-pentane | |
|   Normal butane | |
|   Isobutane | |
|   Propane | |
|   Non-condensible gases | 0.1 |
|   Tar | |
|   Loss | 19.0 |

The results in the foregoing third table indicate that boron trifluoride alone is not a destructive hydrogenation catalyst.

The accompanying drawing illustrates diagrammatically an arrangement of apparatus for carrying out a process for the production of isobutane and a motor fuel by destructive hydrogenation of a hydrocarbon oil, such as a gas oil in the presence of hydrogen chloride and boron trifluoride. The purpose of this drawing is to illustrate one process in which the catalyst comprised in my invention may be utilized in preparing isobutane and higher boiling hydrocarbons. It is not intended that this invention be limited to the particular apparatus or flow presented in the drawing.

Referring now to the drawing, the charging stock is introduced to the system through line 1 controlled by valve 2 from which it enters pump 3 discharging into line 4 controlled by valve 5. After passing through valve 5, the charging stock enters line 6 wherein it is commingled with recycle fractions obtained in a manner hereinafter set forth to form the combined feed for the heating coil 7. Hydrogen, hydrogen chloride and boron trifluoride obtained from line 30 as shown in the diagram are commingled with this combined feed which is then heated in coil 7 to a temperature within the approximate limits of 50–300° C. while utilizing pressure within the approximate limits of 50–2000 pounds per square inch. This heated mixture is then directed to line 9 controlled by valve 10 and supplied to fractionating column 11. When temperatures above 300° C. are used, the quantity of tar formed is excessive, while at temperatures below 50° C., the reaction is too slow to be commercially feasible. Fractionating column 11 operates to separate as an overhead product, gasoline and non-condensible gases which are removed by way of line 12 controlled by valve 13 and directed to cooler and condenser 14. The mixture of liquid and uncondensed and undissolved gases leaves cooling coil 14 by way of line 15 controlled by valve 16 and enters receiver and separator 17. The liquid product collected in receiver 17 is removed by way of line 18 controlled by valve 19. This liquid fraction is preferably redistilled to remove dissolved catalyst and then subjected to a caustic wash to remove final traces of acid. The uncondensed and undissolved gases collected in receiver 17 are removed by way of line 20 and after passing through valve 21 enter compressor 22 which discharges into line 23 controlled by valve 24. The compressed gases enter absorber 25 wherein they come in contact with an absorbing liquid. The lean gases leaving absorber 25 consist principally of hydrogen and smaller quantities of hydrogen chloride and boron trifluoride and are removed by way of line 26 controlled by valve 27 and enter compressor 29 which discharges into line 30 controlled by valve 31. After passing through valve 31 this recycle mixture of gases is commingled with fresh hydrogen, hydrogen chloride and boron trifluoride supplied through line 32 controlled by valve 33 from which it enters pump 34 discharging into line 35 controlled by valve 36. After passing through valve 36, the two gas streams are mixed in line 30 and are supplied to line 6 wherein they are commingled with a recycle stream of unconverted oil.

The rich absorber oil leaving absorber 25 contains isobutane and smaller quantities of the gaseous paraffins and enters line 38 controlled by valve 39 and after passing through pump 40 enters line 41 controlled by valve 42. This rich oil enters stripper 43 wherein the normally gaseous paraffins are distilled from the absorption oil. These gaseous paraffins leave stripping column 43 by way of line 44 controlled by valve 45. The isobutane may be removed from these gaseous paraffins by well known means not shown. The lean absorbing oil is removed from stripper 43 by way of line 46 and after passing through valve 47 enters pump 48 which discharges into line 49 controlled by valve 50. After passing through valve 50, this absorption oil enters absorbing column 25 for re-use.

The higher boiling liquid (liquid boiling above the gasoline boiling range) is removed from column 11 by way of line 51. A portion of this higher boiling liquid may be removed from line 51 by way of line 52 and after passing through valve 53 enters pump 54 discharging into line 55 controlled by valve 56. After passing through valve 56, this higher boiling liquid enters line 6 from which it is directed to further catalytic treatment in coil 7 as shown in the drawing. A portion of the higher boiling liquid removed from fractionator 11 by way of line 51 passes through valve 57 and enters pump 58 discharging into line 59 controlled by valve 60. This higher boiling fraction is directed to fractionator 61 wherein a separation from non-vaporous liquid residue is made. Non-vaporous liquid residue is removed from fractionator 61 by way of line 62 and after passing through valve 63 is removed from the system. The over-head product from column 61 is removed by way of line 64 and after passing through valve 65 enters pump 66 which discharges into line 6 and after passing through valve 67 becomes part of the combined feed for heating coil 7 for treatment as hereinbefore set forth.

I claim as my invention:

1. A process for the preparation of motor fuel and isobutane which comprises subjecting a hydrocarbon oil charging stock to the action of hydrogen in the presence of boron trifluoride and hydrogen chloride under conditions of temperature, pressure, and time of contact regulated to cause destructive hydrogenation of said charging stock with the formation of substantial yields of isobutane and motor fuel.

2. A process for the preparation of motor fuel and isobutane which comprises subjecting a hydrocarbon oil charging stock to the action of hydrogen in the presence of boron trifluoride and hydrogen chloride at a temperature of about 50 to 300° C. and a pressure of about 50–2000 pounds per square inch and for a time of contact suitable to cause destructive hydrogenation of said charging stock with the formation of substantial yields of isobutane and motor fuel.

3. A process for the preparation of a motor fuel and isobutane which comprises subjecting a hydrocarbon oil charging stock to the action of hydrogen in the presence of boron trifluoride and hydrogen chloride under conditions of temperature, pressure, and time of contact suitable to the destructive hydrogenation of said hydrocarbon oil charging stock with the formation of substantial yields of motor fuel and isobutane, separating from the products of said hydrogenating step isobutane, a motor fuel, and higher boiling products, and subjecting said higher boiling products to further destructive hydrogenation in the presence of the aforesaid catalyst with the formation of further quantities of isobutane and motor fuel.

4. A process for the preparation of motor fuel and isobutane which comprises subjecting a combined feed formed as hereinafter described to the action of hydrogen in the presence of boron trifluoride and hydrogen chloride under conditions of temperature, pressure, and time of contact suitable to the destructive hydrogenation of said hydrocarbon oil charging stock with the formation of substantial yields of motor fuel and isobutane, separating from the products of said hydrogenating step isobutane and a fraction comprising the higher boiling products and commingling said fraction of higher boiling products with the hydrocarbon oil charging stock to form the combined feed for the process for treatment as hereinbefore set forth.

5. A process for the production of iso-butane which comprises subjecting a hydrocarbon oil charging stock to the action of hydrogen in the presence of boron trifluoride and hydrogen chloride under conditions of temperature, pressure and time of contact regulated to cause destructive hydrogenation of said charging stock with the formation of substantial yields of isobutane.

6. A process for the production of iso-paraffins which comprises subjecting a hydrocarbon oil charging stock to the action of hydrogen in the presence of boron trifluoride and hydrogen chloride under conditions of temperature, pressure and time of contact conducive to destructive hydrogenation of said charging stock with the formation of substantial yields of iso-paraffins.

LOUIS SCHMERLING.